United States Patent [19]

Turillon et al.

[11] 4,121,024
[45] Oct. 17, 1978

[54] NEGATIVE ELECTRODE FOR LEAD-ACID STORAGE BATTERY

[75] Inventors: Pierre Paul Turillon, Ramsey, N.J.; Michael Neill Hull; George Frederick Nordblom, both of Yardley, Pa.

[73] Assignees: The International Nickel Company, Inc., New York, N.Y.; ESB Corporation, Philadelphia, Pa.

[21] Appl. No.: 850,271

[22] Filed: Nov. 10, 1977

[51] Int. Cl.$^2$ ............................................. H01M 4/66
[52] U.S. Cl. .................................................. 429/245
[58] Field of Search .................. 429/245, 225–228; 204/290 R, 291–293; 75/200, 208 R, 222

[56] References Cited

U.S. PATENT DOCUMENTS

| | | | |
|---|---|---|---|
| 2,030,229 | 2/1936 | Schwarzkopf | 75/1 |
| 2,096,924 | 10/1937 | Schwarzkopf | 29/189 |
| 2,148,040 | 2/1939 | Schwarzkopf | 29/188 |
| 2,422,439 | 6/1947 | Schwarzkopf | 75/22 |
| 3,798,070 | 3/1974 | Ruben | 429/245 X |
| 4,037,031 | 7/1977 | Jacob | 429/225 X |

FOREIGN PATENT DOCUMENTS

| | | |
|---|---|---|
| 643,567 | 1937 | Fed. Rep. of Germany. |
| 2,524,653 | 6/1974 | Fed. Rep. of Germany. |
| 236,110 | 5/1945 | Switzerland. |

Primary Examiner—Charles F. Lefevour
Attorney, Agent, or Firm—Ewan C. MacQueen; Francis J. Mulligan, Jr.

[57] ABSTRACT

A negative lead-acid storage battery electrode having a base made of a porous, sintered metal lighter than lead infiltrated with lead, lead alloy or a metal wetted by pure lead in the molten state. The base is then provided with a protective layer of pure lead and negative active mass atop the pure lead layer.

5 Claims, 1 Drawing Figure

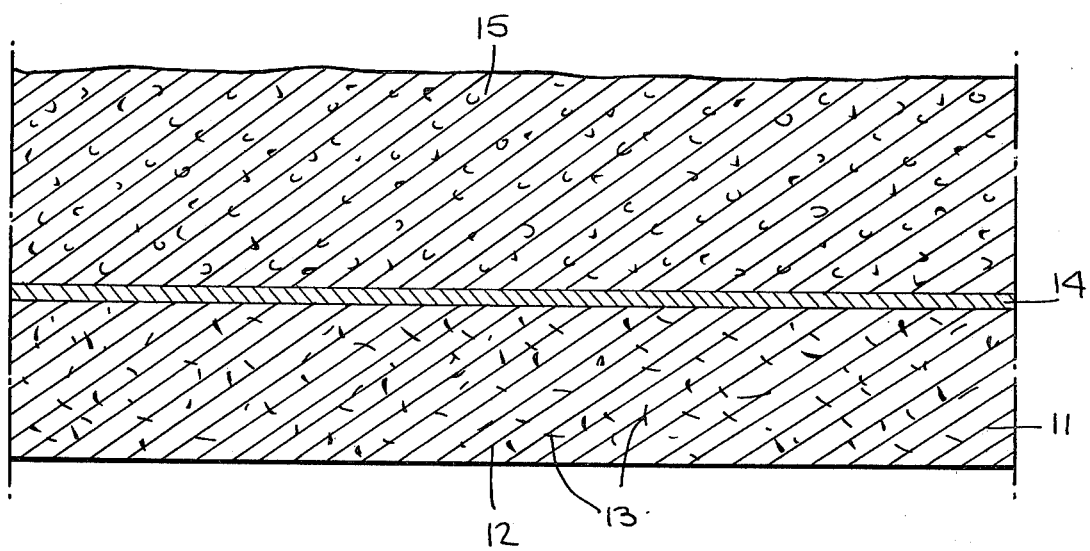

NEGATIVE ELECTRODE FOR LEAD-ACID STORAGE BATTERY

The present invention is concerned with negative electrode structures for lead-acid storage batteries. It is a companion invention to an invention described in a concurrently filed application by the same inventors entitled Battery and Electrolytic Cell Electrodes.

In general, regardless of the particular type of mechanical design employed in a lead-acid battery, the negative electrode of current, state of the art batteries comprises a base of pure lead upon the surface of which is pasted or otherwise deposited and adhered an active mass which in the charged state essentially comprises spongy lead and in the discharged state approaches lead sulfate. The lead base of the negative electrode is heavy and is mechanically very weak.

It has now been discovered that by means of a composite structure a highly advantageous negative electrode for a lead acid battery can be provided.

It is an object of the present invention to provide a novel negative lead-acid storage battery electrode.

Other objects and advantages will be observed from the following description, taken in conjunction with the drawing in which:

The FIGURE depicts a cross section of a negative lead acid storage battery electrode of the present invention.

Generally speaking the present invention contemplates a negative lead-acid storage battery electrode having a compositely structured base comprising a sintered matrix of metal substantially less dense than lead at least partially infiltrated with lead, an alloy of lead or a metal wetted by lead in the liquid state and bearing on at least part of the surface thereof and metallurgically bonded thereto a layer of pure lead. The total electrode includes this base, the layer of pure lead and active mass adherent to the layer of pure lead.

Referring now to the drawing, negative electrode base 11 comprises a matrix 12 of metal less dense than lead having lead 13 at least partially infiltrated through pores in matrix 12. At least a portion, and advantageously the whole of the surface of base 11, has pure lead 14 coated thereon and metallurgically bonded thereto. Active mass 15 is adhered to pure lead 14 in any convenient manner well known to those of normal skill in the art.

The metal of matrix 12 can be any strong metal less dense than lead which can be formed into a sintered powdered compact and is in the solid state at lead infiltration temperatures (e.g., 400° C.–550° C.). Examples of such metals include iron, nickel, copper, titanium, zirconium, manganese and aluminum and alloys of these metals. Particular advantage is found in the use of titanium which has a density of 4.5 g/cc and which in powder form can be readily compacted, sintered and infiltrated with lead. Lead 13 as an infiltrant can be pure lead or lead-rich alloy or in some instances can be replaced by a lighter metal which is wetted by pure lead in the molten state.

When the base of the lead-acid battery negative electrode of the present invention is made of sintered titanium infiltrated with lead excellent mechanical characteristics (compared to pure lead) can be achieved. Table I sets forth some mechanical characteristics of sheet form composites having a matrix of titanium sintered at about 980° C. for 1 hour in an argon atmosphere and thereafter infiltrated with a melt containing 0.5% tin, balance lead at 550° C. for 1 hour.

TABLE I

| Vol. % Ti | Vol. % Infiltrant | Vol. % Pores | Y. S. Kg/Cm² | UTS Kg/Cm² | Elong % in 2.54cm |
|---|---|---|---|---|---|
| 84.24 | 12.84 | 2.93 | 2094 | 2924 | 2.0 |
| 83.10 | 12.72 | 4.16 | 2195 | 2700 | 2.0 |
| 83.05 | 13.68 | 3.26 | 2108 | 2632 | 3.0 |
| 75.70 | 20.92 | 3.39 | 1761 | 2203 | 3.0 |
| 75.54 | 23.39 | 1.08 | 1693 | 2224 | 2.0 |
| 67.98 | 28.66 | 3.36 | 1353 | 1748 | 2.0 |
| 69.04 | 27.43 | 3.52 | 1401 | 1754 | 2.0 |
| 68.63 | 27.74 | 3.63 | 1306 | 1659 | 1.0 |
| 61.06 | 34.95 | 3.96 | 1068 | 1374 | <1.0 |
| 62.46 | 32.81 | 4.73 | 1162 | 1489 | 1.0 |

Room temperature electrical resistivities of composite materials similar to those for which mechanical test results are given in Table I but of rod form rather than sheet form range within the limits of about 30 to about 100 microhm-centimeter. Additionally, the sheet-form titanium-lead composites giving the mechanical test results set forth in Table I have densities ranging from about 45% to about 60% of lead. Totally the mechanical characteristics, the electrical resistivities and the densities of titanium-lead composites enable negative lead-acid battery electrode structures to be made which are much lighter than, much stronger than, and have equal or better electric current carrying capacity than conventional structures made of pure lead.

When titanium-lead composites are used as base 11 of negative electrodes of the present invention, it is advantageous to maintain the volume percent of titanium of the composite within the range of about 50 to about 90%, the balance of the composite being lead or lead alloy infiltrant and up to about 5% pores. Generally, the composite can be made by grinding sponge titanium into powder, forming the powder into any desired shape by conventional powder metallurgical means, sintering the formed powder shape and thereafter infiltrating the thus sintered shape with molten lead or other infiltrant. Table II sets forth the volume percent porosity which has been observed in sintered bodies of titanium, prior to infiltration, which have been compacted under the indicated pressure.

TABLE II

| Compacting Pressure Kg/cm² | Volume % Voids |
|---|---|
| 0 (loose powder) | 58.6 |
| 140.6 | 39.1 |
| 281.2 | 37.4 |
| 562.4 | 34.7 |
| 843.6 | 31.6 |
| 1125 | 29.1 |
| 1400 | 25.6 |
| 2812 | 18.3 |
| 3500 | 17.2 |
| 4218 | 15.3 |
| 4920 | 11.3 |

Greater detail regarding the formation of titanium-lead composite structures is set forth in U.S. application Ser. No. 850,290, referred to hereinbefore and filed concurrently herewith by us. The more detailed disclosure of U.S. application Ser. No. 850,290 is incorporated herein by reference.

For use in a negative lead-acid storage battery electrode, it is essential that any surface of the composite structure which bears negative active mass must be separated from that active mass by layer of pure lead 14. Ordinarily this layer, betweeen 0.002 and 0.015 cm thick, completely envelopes the infiltrated matrix base, serves to anchor negative active mass to the base and, more importantly, serves to protect the base from corrosion by the acid electrolyte of the battery. The layer of pure lead is most conveniently applied by merely dipping the composite base into molten pure lead, removing the thus coated base and allowing the pure lead to freeze on the surface. If portions of base must be exposed, these portions can be stopped off before immersion or scraped clean after immersion. If desired, the pure lead can also be the infiltrant and coating and infiltration can occur simultaneously. Alternatively, pure lead in foil form can be cold bonded to the surface of the infiltrated composite base. Lead or lead alloy at least partly infiltrated into pores in matrix 12 provides a means to firmly metallurgically bond protective pure lead layer 14 to base 11 in contrast to relatively weak bonding between pure lead and solid metal cores of negative electrodes which have heretofore been suggested in the prior art.

Alternatively, normal atomic bonding to the lead in the matrix can also be achieved by electroplating a layer of lead over the negative core.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A negative electrode for lead-acid storage batteries comprising
    (A) a base comprising a porous, sintered matrix of metal substantially less dense than lead infiltrated with a metal selected from the group consisting of lead, lead alloys and metals wetted by lead in the molten condition:
    (B) a layer of pure lead metallurgically bonded to and covering at least a part of the surface of said base and:
    (C) negative active battery mass adhered to said layer of pure lead.

2. A negative electrode as in claim 1 wherein the matrix metal substantially less dense than lead is selected from the group consisting of iron, nickel, copper, titanium, zirconium, manganese, aluminum and alloys thereof.

3. A negative electrode as in claim 2 wherein the matrix metal is titanium.

4. A negative electrode as in claim 1 wherein the layer of lead completely envelopes the infiltrated matrix.

5. A negative electrode as in claim 1 wherein the base comprises a porous matrix having, in percent by volume, about 50 to about 90% titanium infiltrated with lead or lead alloys.

* * * * *